United States Patent [19]

Cronen, Jr.

[11] 4,037,699

[45] July 26, 1977

[54] SAFETY APPARATUS FOR A PUNCH PRESS

[76] Inventor: Peter J. Cronen, Jr., 2910 Fairchild Ave., Wayzata, Minn. 55391

[21] Appl. No.: 599,334

[22] Filed: July 28, 1975

[51] Int. Cl.$^2$ .............................................. F16D 7/00
[52] U.S. Cl. .................................. 192/134; 192/130; 192/131 R; 100/53
[58] Field of Search ............... 192/134, 130, 129, 133, 192/150, 132; 100/53

[56] References Cited

U.S. PATENT DOCUMENTS

| | | | |
|---|---|---|---|
| 3,276,557 | 10/1966 | Brown | 192/130 |
| 3,300,009 | 1/1967 | Hess | 192/130 |
| 3,815,456 | 1/1974 | Braather | 192/131 R |

Primary Examiner—Samuel Scott
Assistant Examiner—Randall Heald
Attorney, Agent, or Firm—Merchant, Gould, Smith, Edell, Welter & Schmidt

[57] ABSTRACT

Safety apparatus attachable to a punch press for providing a time delay between the starting of the drive-brake motor which drives the flywheel and the engagement of the clutch which couples the flywheel to the drive shaft. The time delay allows the flywheel to be brought up to sufficient speed by the drive motor prior to its engagement with the crankshaft such that it imparts sufficient momentum to the crankshaft to perform the task intended for the crankshaft ram. A safety shut-off switch is utilized in combination with the time delay mechanism to totally shut down the drive-brake motor at the end of a pressing cycle of the drive shaft by shutting off motor power, causing the braking function of the motor to stop the flywheel. The start of the drive motor and the initiation of the time delay for engaging the clutch are simultaneously initiated by the downward movement of a safety shield which may be attached to the press to shield the work area during movement of the flywheel.

10 Claims, 5 Drawing Figures

SAFETY APPARATUS FOR A PUNCH PRESS

BACKGROUND OF THE INVENTION

1. Field of the Invention

Safety apparatus including time delay switching means and pneumatic control apparatus for engaging the clutch of a punch press to stop and start the flywheel of the punch press only when the press operator is properly protected from the work area.

2. Description of the Prior Art

Punch presses of various designs and sizes have long been utilized for pressing metallic objects by means of a die positioned beneath the ram of the press. Typically, such presses utilize a ram which is connected to a crankshaft, with the crankshaft driven by a flywheel. The flywheel in turn is driven by a drive motor which is connected to the flywheel by means of belts or other apparatus. The momentum which is developed by rotation of the flywheel is transfered to the drive shaft when a clutch engages the two members and the drive shaft in turn propells a ram downwardly.

Because it is necessary for the drive motor to turn the flywheel through several revolutions before the flywheel developes sufficient momentum to drive the ram with sufficient force to press the article being formed, it has been standard operating procedure in the operation of such presses to leave the flywheel running at all times. In this manner, the flywheel maintains a high level of momentum through a continuous high speed of revolution.

Since the press ram must be moved up and down in a controlled cyclical fashion to allow the article being worked upon to be placed beneath the ram prior to the down stroke of the ram, various clutch mechanisms have been utilized to selectively engage the flywheel with the drive shaft, the drive shaft in turn controlling the up and down motion of the ram. Typically, the clutch is engaged by means of various linkages which are controlled by mechanical, pneumatic or hydraulic impetus from a foot pedal or other triggering device.

Historically, because of the continuous motion of the flywheel and the availability of convenient means for engaging the flywheel with the drive shaft, injuries to workers has frequently occurred as a result of inadvertant engagement of the clutch mechanism which causes the ram to move downwardly when the worker or operator is positioning the work beneath the ram. Such inadvertant operation has resulted both from mechanical failures and from inadvertant operation of trigger device by the actions of the worker or other forces. In an effort to reduce the number of injuries which have resulted from the inadvertent movement of the ram, various shielding devices have been utilized. Such devices generally include a movable shield which shields the area beneath the ram from the operator. The shields are typically moved from an open position wherein the operator has access to the area beneath the ram to a closed position wherein it is impossible for the worker to reach into the area beneath the ram when this shield is in a lowered position. Such shielding devices incorporate various apparatus for moving the shield into and out of the shielding position in response to operation of the triggering device which engages the clutch mechanism. Despite the use of such shields, injuries have continued to result both due to mechanical malfunctions and to accidental or intentional bypassing of the safety device by the operator.

To further reduce the number of injuries occurring in the operation of punch presses, the Occupational Safety and Health Act (OSHA) has been enacted by Congress and provides new operating requirements for such punch presses. Included are requirements that they flywheel of the punch press be stopped and started with each punching cycle of the ram. The purpose of such regulations is to eliminate the presence of a constantly moving force, i.e. the flywheel, which may inadvertantly be engaged with the drive shaft to move the ram downwardly while a workpiece is being inserted beneath the ram by the operator. These regulations require that the flywheel be stopped following each cycle and during the period the workpiece is being inserted beneath the ram, regardless of whether a safety shield is utilized or not.

The promulgation of such regulations has in effect made obsolete many existing designs of punch presses. In many existing punch presses, while the motor itself may be stopped and started at will, when the motor is restarted it is necessary for the flywheel to rotate during a finite interval in which the momentum of the flywheel is increased sufficiently to provide suitable power to the drive shaft for moving the ram at the desired pressure level. As a result, in addition to starting and stopping the drive motor in unison with the insertion of the workpiece beneath the ram, it is necessary to properly time the engagement of the clutch mechanism such that the flywheel is at proper momentum prior to the engagement of the clutch. Such timing of the clutch engagement would have to be carefully and consistently established so that the flywheel is at the proper momentum to deliver power to the drive shaft at the correct pressure level. In addition, it would be desirable if such timing of the clutch engagement were syncronized with the starting of the motor by the triggering device and with the upward and downward movement of any safety shield which were utilized in combination with the punch press. Such devices are believed not to be presently available in a suitable form for allowing many existing punch presses to be utilized in a manner consistent with the recently established safety regulations.

SUMMARY

The present invention is a safety apparatus which is attachable to a punch press of the type having an electric drive motor which is started by a triggering device and which drives a flywheel. The apparatus includes a dual function motor which is both the drive motor and a breaking motor. Thus, when powered up the motor drives the flywheel, but when power is turned off to the motor, it immediately brakes, causing the flywheel to stop relatively instantaneously.

In the preferred embodiment, the flywheel of the punch press is attached to a ram drive shaft by means of a selectively engageable clutch mechanism. The motor triggering or starting device may be a foot pedal or other operator-controlled mechanism located adjacent the press. A time delay mechanism is provided to delay the engagement of the flywheel clutch until such time as the flywheel has gained sufficient momentum to drive the ram at the desired pressure level. A time delay mechanism includes a magnetically operated switch located adjacent a movable safety shield which acts to shield the work area beneath the press ram. A metal element on the safety shield serves to activate the magnetic switch as the safety shield moves to its closed position in response to the activation of a triggering device such as a foot pedal.

The magnetic switch serves to start the drive motor and also initiates an electrical timer. The electrical timer is connected to a pneumatic control valve which controls the flow of pneumatic fluid to a clutch piston. The timer has a built in time delay which can be varied. When the time delay has tolled, the pneumatic control valve is opened which allows pneumatic fluid to flow to the clutch piston. This activates the clutch piston which acts to move the piston rod in a downward direction. This engages a pivoted actuator arm which in turn engages a rolling clutch, each of which form a part of the clutch mechanism. When the rolling clutch is engaged, the momentum of the flywheel is imparted to the drive shaft which has an off-set portion attached to the top of the press ram. After the drive shaft has moved one revolution to cycle the cam onto the workpiece, controlled switches attached adjacent the end of the drive shaft are activated by the rotation of the drive shaft and shut off power to the drive motor. Since the drive motor is a braking motor, this cessation of power to the motor brakes the motor to stop the flywheel relatively instantaneously. The switching action also pneumatically raises the safety shield for subsequent insertion of a workpiece. This can be done safely because the braking force of the motor assures quick stopping of the flywheel. This cycle is repeated each time a workpiece is inserted beneath the ram. When attached to an existing punch press, this safety apparatus replaces the conventional drive motor with a braking motor and allows the flywheel drive motor to be stopped and started with sufficient time delay in the engagement of the clutch for the flywheel to build up proper momentum prior to the pressing cycle. The time delay of the clutch engagement is syncronized with the movement of the safety shield to provide a punch press which operates safely within present OSHA regulations.

DETAILED DESCRIPTION OF THE PREFERRED EMBODIMENT

Figure 1:
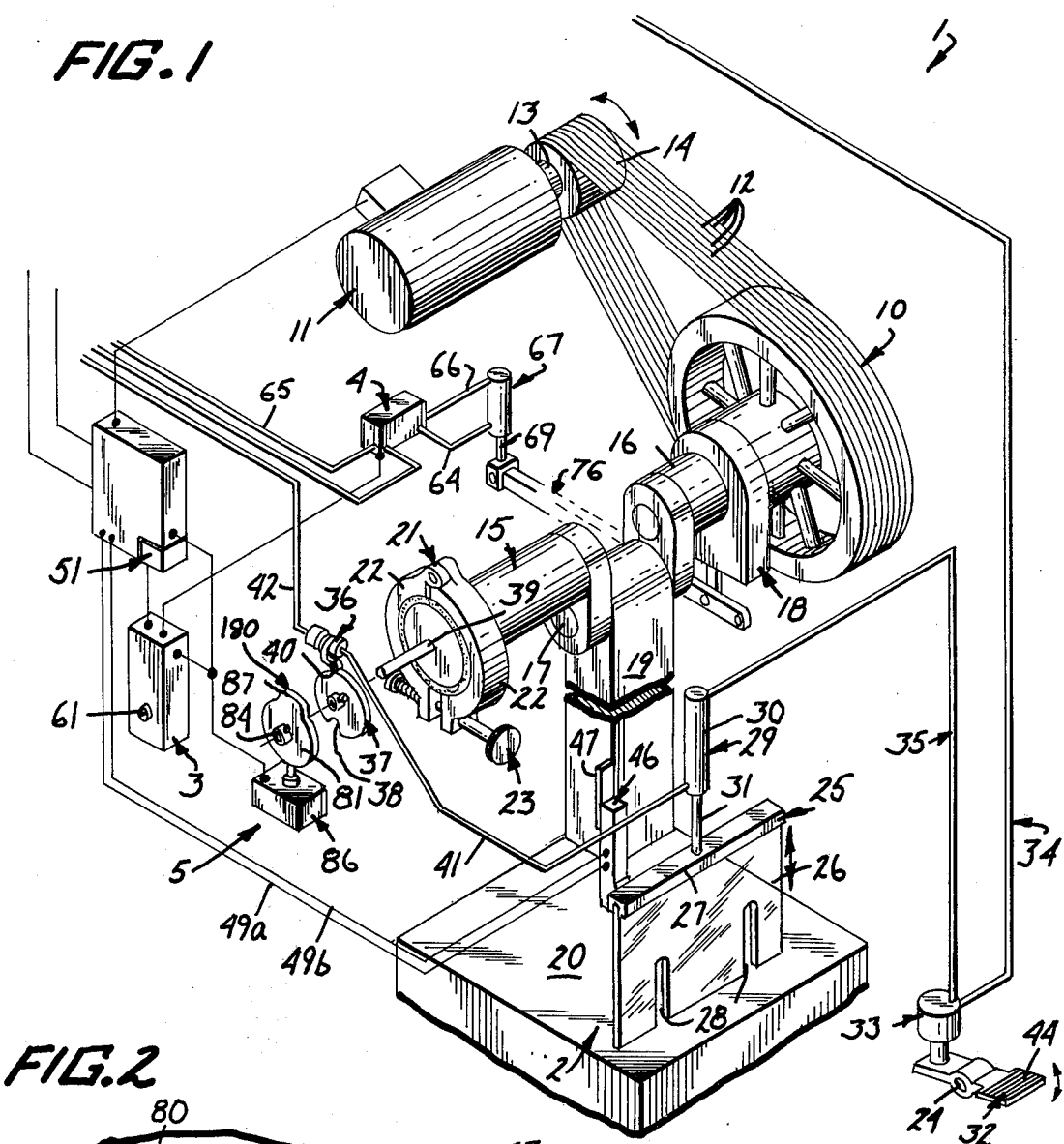
FIG. 1 is a perspective view of various elements of a punch press showing certain elements schematically.

Referring to FIGS. 1-5, wherein like numerals refer to like structural elements, the present invention incorporates safety apparatus which are attachable to a punch press 1. In the preferred embodiment, safety shield apparatus 2 is utilized to shield the working area of the press 1. A timer 3 in combination with a piston control valve 4 and a shut-off device 5 allows the punch press flywheel to attain sufficient speed prior to initiation of the pressing operation.

Referring to FIG. 1, punch press 1 generally comprises a flywheel 10 which is driven by a drive motor 11 (which is a breaking motor) connected to flywheel 10 by means of pulley belts 12. The pulley belts 12 are attached to drive motor 11 by means of a motor drive shaft 13 which is coupled to motor 11 and a drive shaft pulley 14. When drive motor 11 rotates flywheel 10 a sufficient circumferential distance, flywheel 10 developes sufficient momentum to rotate crankshaft 15 which in turn drives a ram 19. Crankshaft 15 consists of a central shaft 16 to which is attached an offcenter portion 17 which is attached to the top portion of ram 19. The operation of flywheel 10 and crankshaft 15 is consistent with methods and techniques well known in the punch press art.

The present invention utilizes a drive-brake motor. This type of motor has a breaking action which is activated when power to the motor is shut off to stop movement of the flywheel relatively instantaneously. When the term "drive motor" is utilized in this description or in the claims, it should be understood that a braking drive motor is utilized. While various motors of this type may be utilized, the Applicant has found that the following three phase motor is well suited:

| RELIANCE DUTY MASTER AC MOTOR | | | | | |
|---|---|---|---|---|---|
| Frame | Type | Ins Class | ID No. | | |
| 215T | P | H | Y 273685A1-KZ | | |
| HP | RPM | Volts | Amps | HZ | SF |
| 3 | 830 | 230/460 | 12.8/6.4 | 60 | 1.0 |

Further the motor ishigh slip in that it has high cooling capacity to prevent overheating and burn out, which may result from a non high slip (cooled) motor. The Applicant has found that the use of a horsepower rating of the motor about 20–40% larger (e.g. 3hp instead of 2) than the normal level for the press being utilized is beneficial in that a sufficient press tonnage level is reached quicker, after power up of the motor. The following brake specifications have been found to be well suited to use in this invention.

FMC corporation brake Model No. 1-087-031 with 25 torque foot-pounds. The specifications are:

| Volts | HZ |
|---|---|
| 208–230/416–460 | 60 |
| 190–230/380–460 | 50 |

Flywheel 10 is operably connected to crankshaft 15 by means of a clutch engagement mechanism 18, the details of which will be described later. A drag brake 21 consisting of opposed collar members 22 which are pivotally attached at one side and joined together by means of an adjustment screw device 23 at the opposite side is attached to the end of crankshaft 15 opposite flywheel 10. It is the purpose of drag brake 21 to provide a braking force on crankshaft 15 to retard its motion after the crankshaft 15 has been disengaged from flywheel 10 such that it will come to a complete stop prior to a subsequent pressing cycle. This braking force is in addition to the braking action of drive motor 11.

Positioned beneath ram 19 is a work surface 20. Work surface 20 is intended to hold the workpiece (not shown) which is positioned beneath ram 19 for forming. In the preferred embodiment, a safety gate 25 is positioned in front of the area beneath ram 19 and generally adjacent work surface 20. It is the purpose of safety gate 25 to move from a shielding position (shown in FIG. 1) wherein it prevents access to the area beneath ram 19, to an open raised position wherein the area beneath ram 19 is accessible. In the preferred embodiment, safety gate 25 consists of a generally planar rectangular gate panel 26 which is translucent, such as a plastic material, with a metallic edging strip 27 extending across the top of the shield for purposes of mounting it to its drive apparatus. Slots 28 are provided through which a worker may extend a work tool to manipulate the workpiece positioned beneath ram 19 when gate panel 26 is in its lowered shielding position. It should be noted that many commercial embodiments of shielding gates are available for use on punch presses. Their general purpose is to move from an open to a closed positioned wherein the work area of the punch press is shielded. Such shielding gates may be acquired as kits which can be attached to existing presses or may be built into the presses when they are manufactured. Typically, the shields are operated pneumatically or hydraulically by activation of a triggering device such as a foot pedal which the operator activates after he has placed the workpiece beneath the ram and is ready for the punching cycle of the press.

Referring to the preferred embodiment shown in FIG. 1, safety gate 25 is moved from a raised open position to a lowered closed position by means of a gate piston 29. Gate piston 29 is positioned above safety gate 25 and has a movable piston rod 31 with a free end attached to the metallic edging 27 of safety gate 25. Gate piston 29 consists generally of a cylinder 30 in which piston rod 31 moves. Cylinder 30 may be controlled hydraulically or pneumatically. In the embodiment shown, pneumatic pressure is delivered to cylinder 30 by means of a delivery line 35. The supply of pneumatic pressure to cylinder 30 which moves it from its open to its closed position originates at a source of pneumatic pressure (not shown) and is regulated by a pneumatic valve 33. A pneumatic supply line 34 carries the pneumatic pressure from its source to pneumatic valve 33. Valves such as pneumatic valve 33 are well known in the art and generally provide for the selective metering of pneumatic flow through the valve. In the embodiment shown in FIG. 1, pneumatic valve 33 is opened and closed by means of a foot pedal 32. Foot pedal 32 pivots about a pivot pin 24 in response to pressure from the operator's foot being exerted on tread portion 44. Gate piston 29 may be biased in either an open or closed position by means of a spring or back pressure from the pneumatic or hydraulic line. In either case, the opening and closing of gate 25 by means of gate piston 29 is initiated by the treddling of foot pedal 32. When foot pedal 32 is activated, the gate 25 is closed and cannot again be opened until gate piston 29 is released by means of a gate release valve 36 and a gate release cam 37, details of which will be described later.

Because various safety regulations require that flywheel 10 not be moving while the area beneath press ram 19 is exposed to the operator when a safety gate 25 such as shown in the preferred embodiment is utilized, the closing of gate 25 is preferably synchronized with the starting of drive motor 11, which in turn rotates flywheel 10. In instances where a safety gate 25 is not present, the start-up of drive motor 11 may be initiated by the activation of other starting means which are initiated after the workpiece has been suitably positioned below ram 19. In the preferred embodiment, the downward movement of gate panel 26 is intended to initiate the start of drive motor 11. To accomplish this starting of drive motor 11, a magnetic switch 46 is attached to a mounting bracket 47 which positions the magnetic switch adjacent the position which coincides with the location of metallic edging strip 27 when safety gate 25 is in its lowered closed position. As is shown in detail in FIG. 3, magnetic switch 46 is attached by means of screws to a mounting bracket 47 and incorporates a sensing element 48 which operates to open and close switch 46 in response to a magnetically controlled impulse generated when a metallic object is positioned or moved adjacent sensing element 48. Leads 49a and 49b serve to electrically connect switch 46 to a sequential switching circuit 50 which is shown schematically in FIG. 5, and which will be described in detail later.

In operation, when metallic edging strip 27 of gate 25 moves downwardly past sensing element 48, switch 46 is moved from a normally open position to a closed position. This closing of magnetic switch 46 serves two functions. Referring to the circuit diagram shown in FIG. 5 when switch 46 is closed, power from a power source 98 is transmitted to a relay 51. Relay 51 in turn comprises an energizing coil 97 which is operably connected to movable contacts 93, 94 and 52 which are each in a normally open position with respect to adjacent terminals 91–92, 95–96 and 53–54, respectively. With the closing of magnetic switch 46, coil 97 is energized and movable contact 94 closes the circuit between terminals 95 and 96. This provides power from power source 98 to motor 11. When coil 97 is energized it also moves movable contact 93 to a closed position in contact with stationary contacts 91 and 92. The purpose of this switch closing will be described in detail later.

Figure 5:
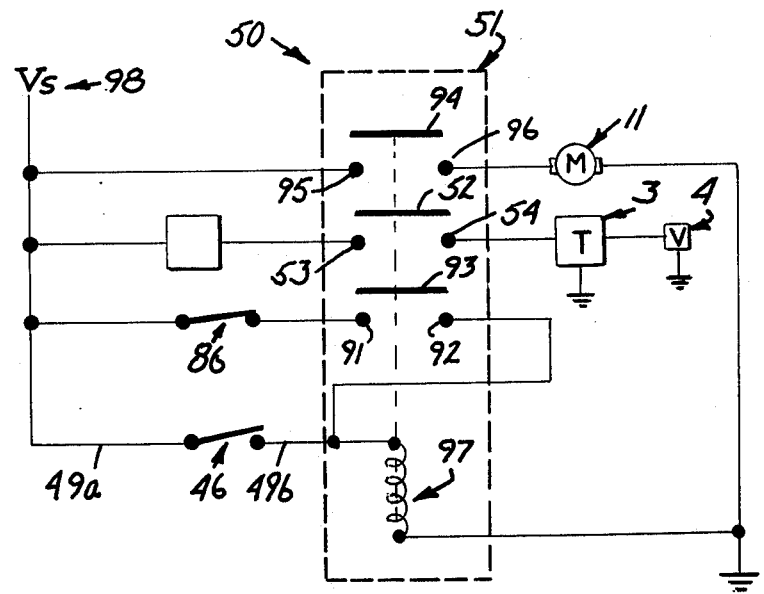
FIG. 5 is a schematic diagram of the electrical circuits utilized in the safety apparatus.

When magnetic switch 46 is closed it also provides power from power source 98 to the timer 3. This is shown in FIG. 5, where movable contact 52 moves to a closed position when coil 97 is energized. This in turn routes power to timer 3. Timer 3 may be of various designs well known in the art which incorporate a time delay mechanism. In the preferred embodiment, a ICS brand timer (Code 6929) is utilized with a time delay range of 0.25 seconds to 5 minutes. The particular time delay utilized is set by means of a set screw. The purpose of timer 3 is to initiate the tolling of a time delay upon initiation of the timer. The time delay is adjustable by means of a set screw 61 or other device which allows the time delay to be pre-selected. Timer 3 serves as a switch controlling the flow of electrical power from power source 98 to pneumatic valve 67. Timer 3 begins to transmit power only after it has been initiated and after the pre-set time delay has tolled. Power then continues to valve 67 until power to timer 3 is terminated by the deactivation of coil 97. Thus, when safety gate 25 moves downwardly, magnetic switch 46 is closed which simultaneously starts drive motor 11 and starts the timing of the time delay in timer 3 to delay the flow of electrical power to valve 67.

As is well known in the art, when a drive motor 11 which is attached to a flywheel 10 is initially started, there is a delay until flywheel 10 is brought up to sufficient angular speed to develop proper momentum with which to drive the punch press ram 19. The Applicant has found that unless the engagement of clutch 18 is delayed until flywheel 10 is at its proper momentum, insufficient force is developed in ram 19 to perform the punching task. The time delay which is necessary between the start up of motor 11 and the development of proper momentum in flywheel 10 will vary depending on the size of motor 11, the size of flywheel 10 and the momentum which is necessary to drive ram 19 for a particular punching operation. This particular time delay must be determined and established for each type of press operation. In the present application, the Applicant has utilized a Bliss inclinable 22 ton press, and has found that a time delay for timer 3 of approximately 1 second is sufficient to bring flywheel up to proper speed. As the punching pressure which is necessary varies from one workpiece to another, it may be necessary to reset timer 3 by means of set screw 61 to the desired time delay.

To delay the engagement of clutch 18 a sufficient time after the start-up of drive motor 11 to bring flywheel 10 up to the selected momentum, the engagement of clutch 18 is controlled by means of piston control valve 4 and clutch piston 67. Piston control valve 4 may be a pneumatic, hydraulic or other type of valve (or switch) which is operably positioned intermediate the source of activation energy for clutch piston 67. In the preferred embodiment shown in FIG. 1, piston control valve 4 (manufactured by Mphrey Products, Model 250E-3-10, 30 PSI) operates off the same pneumatic source of power which controls the activation of safety gate 25. A pneumatic supply line 65 extends to pneumatic control valve 4. This supply of pneumatic pressure is metered by means of selective activation of piston control valve 4.

One embodiment of the operation of timer 3, piston control valve 4 and clutch piston 67 can be described as follows. A supply of pneumatic pressure is fed to piston control valve 4 through a feed line 65. A supply line 66 extends out of piston control valve 4 to clutch piston 67. Piston control valve 4 is an electrically controlled pneumatic valve. It is in a normally closed position wherein pneumatic pressure from supply line 65 is not passed to supply line 66. The pressure through supply line 65 may in turn be metered by means of foot pedal 32 or other devices for controlling the flow of pneumatic pressure through line 65 to piston control valve 4. Piston control valve 4 is of the type which contains a switching mechanism for closing the valve. The valve 4 is in a normally closed position. Thus, when pedal 32 or other activation means are activated, pneumatic pressure flows to control valve 4 is not metered through control valve 4 in its normally closed position. To open piston control valve 4 and allow the flow of pneumatic pressure to clutch piston 67, piston control valve 4 must receive a supply of electrical energy. This supply of electrical energy is routed to control valve 4 by means of relay 51 shown in FIG. 5. Movable contact 52 in relay 51 is in a normally open position which prevents the flow of power timer 3 and then to control valve 4. As is shown in FIG. 5, movable contact 52 is moved to a closed position when coil 97 is energized. Thus, with the closing of magnetic switch 46, timer 3 is placed in circuit with power source 98. In this embodiment, a transformer 55 is positioned between power source 98 and timer 3 to allow for different voltage levels between the timer and the power source and between the motor and the power source.

Timer 3, as was noted earlier, may be of various designs. In this embodiment, timer 3 contains a switch whose movement from an open to a closed position is controlled by a timing mechanism. Thus, once timer 3 is initiated by the closing of movable contact 52, power is transmitted to timer 3 to initiate the tolling of the time delay. It is not until the time delay has been tolled, that power is switched through timer 3 to piston control valve 4. Thus, as is shown in FIG. 5, motor 11 is initiated the same time as is the start of timer 3. However, the delay which is set into timer 3 prevents current from going to control valve 4 until after the timer has tolled its time delay. At that point, current is sent through timer 3 to control valve 4. Power continues to valve 4 until such time that movable contact 52 is moved to its open position by the opening of cam-controlled switch 86. Thus, when the cam on shaft 39 of drive shaft 15 turns to a stop position, power to motor 11 is stopped as is power to timer 3 and control valve 4.

When timer 3 has tolled its time delay, power is sent to control valve 4. This power moves a switching element within control valve 4 to an open position which allows pneumatic pressure to flow from supply line 65 to supply line 66 and subsequently to clutch piston 67. When clutch piston 67 is activated, piston rod 6 moves from its retracted position to positively engage clutch mechanism 18. This engagement continues as long as clutch piston 67 is acted upon by a supply of pneumatic pressure. This supply of pneumatic pressure in turn continues as long as piston control valve 4 is switched to its open position. This switching to the open position in control valve 4 is maintained as long as there is a supply of electrical energy from timer 3. As was noted earlier, this supply of electrical energy from timer 3 continues from the point when the time delay in timer 3 is tolled until such time as movable contact 52 is opened by the movement of cam-controlled switch 86. Thus, when motor 11 is turned off, power to control valve 4 is interrupted which in turn discontinues the supply of pneumatic pressure to piston 67. Piston 67 may be of various designs wherein piston rod 69 is moved from its retracted position only when pneumatic pressure is present in supply line 66. When this supply of pressure in line 66 is discontinued, i.e. when piston control valve 4 is shut off, a spring 70, or other suitable means, act to return piston rod 69 to its retracted position. This positively disengages the clutch mechanism 18. The clutch mechanism 18 is again engaged when clutch piston 67 is supplied with pneumatic pressure upon the opening of piston control valve 4. This in turn is again initiated when movable contact 52 of relay 51 is moved to a closed position and after timer 3 has tolled its time delay. As has been pointed out in the past, various circuit designs may be utilized to replace that shown in FIG. 5. In addition, various designs for control valve 4, clutch piston 67 and timer 3 may be utilized such that they provide the suitable sequence of operations specified as forming a part of the present invention. It should be noted that a bleed line 64 may be provided in piston casing 68 to allow the biasing spring 70 to return piston rod 69 to its retracted position. Similarly, a positive retraction of piston rod 69 may be accomplished by putting positive pressure through bleed line 64 from a pneumatic source (not shown) which may be controlled by various means. Such would be an alternative embodiment to assure the positive retraction of piston rod 69.

Figure 2:
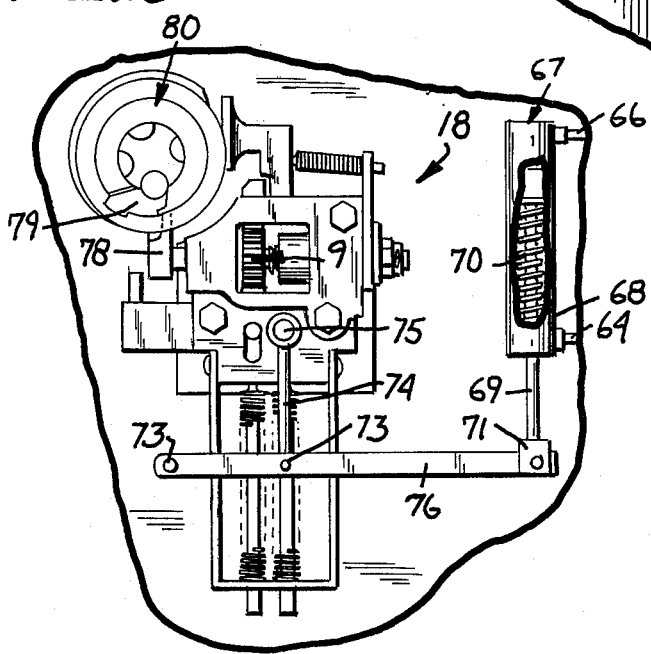
FIG. 2 is a detailed side view of the clutch engagement mechanism showing certain portions cut away.

As was alluded to earlier, referring to FIGS. 1 and 2, clutch piston 67 may be of various conventional designs and generally consists of a cylinder 68 which controls the motion of a piston rod 69. Pneumatic supply line 66 is operably attached to clutch piston 67 and when a supply of pneumatic pressure is conducted through line 66, piston rod 69 is moved by the pneumatic pressure. In the preferred embodiment, piston rod 69 is biased in a retracted position by means of biasing spring 70. In other embodiments (not shown), piston 69 may be biased in an extended or retracted position by means of a back-pressure developed by pneumatic pressure which is fed into cylinder 68. In addition, other types of pneumatic or hydraulic pistons may be utilized where appropriate.

With the activation of clutch piston 67 by pneumatic pressure through line 66, piston rod 69 moves to its extended position and pivots an actuator arm 76 which is coupled to piston rod 69 by a connecting bracket 71. Actuator arm 76 is an elongated member and pivots about an end point 73. It is attached to a connecting rod 74 at a point between pivot point 73 and connecting bracket 71. With the extended movement of piston rod 69, connecting rod 74 moves downwardly which turns a treddle rod 75. As is shown in FIG. 2, a clutch engagement mechanism 18 is provided between clutch piston 67 and crankshaft 15. Various punch presses have different designs for clutch engagement mechanism 18 and the embodiment shown is merely representative of the function served by such devices. The particular design of the clutch engagement mechanism is not critical to the present invention as long as it provides for the positive engagement and disengagement of the clutch only in response to movement of the clutch piston rod. In the preferred embodiment this activating force is provided by clutch engagement piston 67. With the positive downward movement of actuator arm 26 and connecting rod 74, treddle rod 75 is rotated in such a manner that a gear mechanism 9 operably moves a latch element 78. Latch element 78 then moves upwardly wherein it intercepts a clutch hook 79 attached to clutch wheel 80. Clutch wheel 80 in turn is operably attached to central shaft 16 of crankshaft 15. In the preferred embodiment, clutch wheel 80 is part of what is known in the art as a "rolling clutch". Thus, in summary, the downward movement of piston rod 69 moves actuator arm 76 and connecting rod 74. This positive mechanical movement of connecting rod 74 serves to engage gear mechanism 9 in such a way that latch element 78 activates clutch wheel 80 to engage the flywheel 10 with crankshaft 15. This engagement between flywheel 10 and crankshaft 15 continues until such time as the pneumatic pressure in cylinder 68 is relieved through bleed line 64 which in turn allows a biasing force in piston 67 to return piston rod 69 to its retracted position. This moves actuator arm 76 upwardly along with connecting rod 74, which again turns treddle rod 75 in an opposite direction to disengage clutch wheel 80. This positive engagement and disengagement of clutch mechanism 18, as utilized in the preferred embodiment, is advantageous over many existing designs wherein the clutch is engaged only by means of biasing springs which are not positively controlled in their biasing action. In such a case, failure or weakening of the biasing springs associated with the clutch mechanism itself in combination with their ability to be disengaged by compressive forces, has been known to allow the clutch to become disengaged and to again become engaged during one cycle. This is known as "double tripping" of the press. This is avoided in the present instance wherein the engagement of the clutch is positively controlled both in the engaging action and in the disengaging action. The positive disengagement is achieved by positive forward and rearward movement of piston rod 69.

Figures 3, 4:
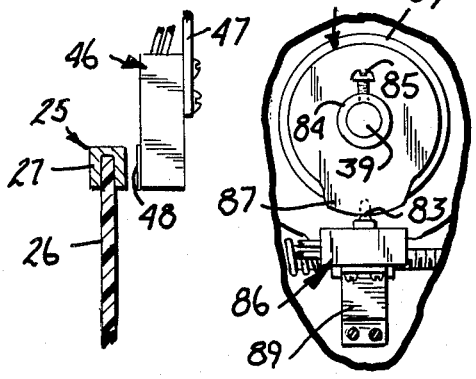
FIG. 3 is a detailed side view of the magnetic switch which is mounted adjacent the safety gate.
FIG. 4 is a detailed side view of the shut-off cam device located at the end of the driving shaft.

Clutch mechanism 18 is disengaged after one cycle of crankshaft 15. This disengagement is accomplished in the following manner. A shut-off device 180 is operably attached to one end of crankshaft 15. As is shown in FIG. 1, a shaft 39 extends upwardly from crankshaft 15 and rotates with it. Shaft extension 39 is intended to carry two cams, a shut-off cam 81 and a gate release cam 37, which will be described in detail later. Shutoff cam 81 is attached to shaft 39 by means of a shaft sleeve 84 which is integrally attached to a cam wheel 82. Shaft sleeve 84 is attached to shaft extension 39 by means of a set screw 85. Other means for attaching the cam to the shaft extension and other detailed designs of the cam itself may also be utilized where appropriate. Attached adjacent to cam wheel 82 is a microswitch 86. Referring to FIG. 4 and the schematic diagram shown in FIG. 5, microswitch 86 is attached to the punch press 1 by means of a bracket 89. An actuator element 83 serves as a movable contact for opening and closing the microswitch. As is shown in FIG. 5, microswitch 86 is in a normally closed position. In such position, actuator element 83 is not touching cam wheel 82. Located at one portion of the periphery of cam wheel 82 is an extended peripheral area which serves as a switching portion 87. During the rotation of crankshaft 15, switching portion 87 of cam wheel 82 is not in contact with actuator element 83 of microswitch 86. However, near the end of the cycle of crankshaft 15, switching portion 87 comes into contact with actuator element 83 to open the microswitch 86. Referring to the circuit diagram shown in FIG. 5, when magnetic switch 46 is actuated by the closing of safety gate 25, coil 97 is energized which in effect moves the movable contacts 52, 93 and 94 into a closed position. This positioning of movable element 93 electrically connects the normally closed microswitch 86 in series with motor 11. Since magnetic switch 46 is only momentarily activated when a magnetic field of sensing element 48 is broken by movement of metal edging 27, switch 46 opens a very short time after it is closed. Thus, this initial closing serves to place microswitch 86 into circuit with motor 11 and is a holding circuit. Since microswitch 86 is normally closed, even after magnetic switch 46 opens, the normally closed microswitch 86 serves to complete the circuit between power source 98 and motor 11. During this period coil 97 continues to be energized through the circuit which is made by microswitch 86. In addition, power is conducted to timer 3 and subsequently to control valve 4. When the movement of cam wheel 82 at the end of a cycle of crankshaft 15 opens the switch by contact with actuator element 83, the power from power source 98 to coil 97 is discontinued. Movable contacts 52 and 93 then move to their normally open position. When microswitch 86 is returned to its normally closed position after the passage of switching portion 87 of cam wheel 82, the circuit between motor 11 and power source 98 and between power source 98 and timer 3 is broken by the opening of movable contacts 93 and 52. This in effect stops motor 11 and retracts piston rod 69. Since motor 11 is a breaking and driving motor, the cessation of power to it will put a breaking force on flywheel 10 to bring it to an immediate stop. In addition, drag brake 21 on crankshaft 15 which was described earlier will also tend to retard the motion of crankshaft 15 until it comes to an at-rest position for recycling of the punch press. With the return of magnetic switch 46 to its normally open position and the return of microswitch 86 to its normally closed position after coil 97 has been de-energized, the sequential switching circuit 50 shown in FIG. 5 is again ready for recycling. This is accomplished by the reclosing of magnetic switch 46 when safety gate 25 again is moved to its closed position. The Applicant has found that the exact positioning of switching portion 87 of cam 82 can be selectively varied by a trial and error positioning of cam 82. The purpose of such positioning is to close switch 86 at exactly the proper point for crankshaft 15 to be in a proper "re-start" position for the subsequent pressing cycle.

The use of shut-off device 180 provides a fail-safe device for punch press 1. Regardless of whether the timer 3 functions or malfunctions, i.e. the timing delay continues which maintains the clutch in its closed position, the completion of one revolution of crankshaft 15 will activate shut-off device 180 to shut off all power to both timer 3 and drive motor 11. Thus, at the end of one revolution of crankshaft 15, all power to drive motor 11 is shut down regardless of whether the timer has properly functioned or malfunctioned and clutch 18 is disengaged. Because motor 11 is a breaking motor, its powering down will instantly brake the movement of flywheel 10. This assures that flywheel 10 is at rest between cycles when a workpiece is positioned beneath ram 19. This complete stopping of flywheel 10 satisfies many recently promulgated OSHA regulations. Because of the design of sequential switching circuit 50, the cessation of power to drive motor 11 recycles energizing coil 97 and sets up the circuit for a subsequent repeat of the switching cycle.

Also attached to shaft extension 39 of crankshaft 15 is a gate opening cam 37. As is shown in FIG. 1, cam 37 is mounted to shaft extension 39 by means of a shaft sleeve 43. Positioned adjacent to cam 37 is a gate release valve 36 which is pneumatically connected between a source of pneumatic pressure (not shown) through a pneumatic supply line 41 to cylinder 30. Gate release valve 36 is of such design, which is well known in the art, that after pneumatic pressure has initially been channelled to cylinder 30 through delivery line 35 in response to the activation of foot pedal 32, the pressure is maintained in cylinder 30 to keep safety gate 25 in its lowered position. However, after crankshaft 15 has turned through one revolution, and indentation 38 in the exterior surface of cam 37 engages a rider element 40 on gate release valve 36. When rider element 40 drops into indentation 38, gate release 36 is opened which allows pneumatic pressure to flow through supply line 42, to gate release 36 and then through supply line 41 to the bottom portion of cylinder 30. The supply of pneumatic pressure through line 41 after gate release valve 36 has been opened, off sets the positive pneumatic pressure on the opposite end of cylinder 30 which is channelled through delivery line 35 after triggering pedal 32 has been activated. This in effect withdraws piston rod 31 into cylinder 30 to raise the safety gate 25. The pneumatic system for gate 25 is then ready for recyling when foot pedal 32 is again depressed to move piston rod 31 downwardly to again close safety gate 25.

It should be noted that various pneumatic and hydraulic systems for opening and closing a safety gate mechanism such as is shown in FIG. 1, or alternative safety mechanisms may be utilized. In addition, such systems may be purely mechanical instead of pneumatic or hydraulic. However, in each instance, it is necessary that the clutch engaging mechanism of the punch press be engaged only after a time delay between the start-up of the drive motor 11. This is accomplished by using the time delay mechanism as has been described earlier for the preferred embodiment and a positive engagement means connected to the timer which engages the clutch after a selected time delay. In addition, a braking motor, instead of merely a "drive" motor, is required to quickly stop the flywheel, thus allowing the change of the workpiece and a subsequent cycle is a rapid, highly productive sequence. Initiation of the drive motor 11 and the timer 3 may be keyed to the movement of a safety gate such as gage 25 shown in the preferred embodiment, or may be keyed to some other starting point for the press cycle. In addition, various detail designs for the clutch engagment mechanisms and the pistons which engage the clutch and which move the safety gate may be utilized and are dictated by basic techniques well known in the art of drive pistons. Similarly, piston control valve 4 may consist of various design which allow the clutch piston to be activated after the timing out of timer 3.

What is claimed is:

1. Safety apparatus attachable to a punch press which includes a flywheel, an electric drive motor which drives the flywheel, and a triggering device for initiating the pressing cycle, the flywheel being engageable with a crankshaft by means of a selectively engageable clutch for driving a ram, said safety apparatus comprising:
    a. a drive and braking motor, said motor driving in one direction when power is supplied to the motor and imparting a braking force in a direction counter to the driving direction when the power supply to the motor is shut off;
    b. means operably connected said drive-brake motor to the flywheel on the punch press for driving and braking the motion of the flywheel;
    c. starting swtich means movable between an open and a closed position for intermittently transmitting power from a power source therethrough;
    d. starting switch actuation means responsive to activation of the triggering device operable connected with the triggering device and with said starting switch means for moving said starting switch means between an open and a closed position when the triggering device is activated;
    e. an energizable timing switch operably connected with said starting switch means so as to become energized when the starting switch means are actuated, said timing switch having a time delay which is initiated when said timing switch is energized, said timing switch being automatically movable between an opened and a closed position at the end of the time delay;
    f. circuit means operably connecting the drive-brake motor with the starting switch means and a power source, for starting the motor when the starting switch means are actuated;
    g. engagement means operably connected to said timing switch for positively engaging the clutch which interconnects the flywheel with the crankshaft, said engagement means movable from a disengaged to an engage position in response to the switching of said timing switch at the end of the time delay to thereby allow the flywheel to move the crankshaft through a pressing cycle; and
    h. shut-off switching means operably attached to the crankshaft and said circuit means for shutting off power to said drive-brake motor after one pressing stroke of the ram has been completed, thereby causing said drive-brake motor to brake the motion of the flywheel to which it is connected.

2. The safety apparatus of claim 1 wherein:
    a. said starting switch actuation means include a safety shield movable from an open position wherein a work area beneath the press ram is generally accessible, to a closed shielding position wherein the work area beneath the ram is generally inaccessible, said shield movable from the open to the closed position in response to activation of the triggering device; and b. said starting switch means include a starting switch movable from an open to a closed position in response to movement of said safety shield from its open to its closed position.

3. The safety apparatus of claim 2 wherein said engagement means include:
a. an electronically controlled valve for selectively passing fluid pressure from a fluid pressure source, said valve movable between an open and a closed position in response to the switching of said timing switch at the end of the time delay;
b. a fluid piston having a movable ram which is moved by fluid pressure channelled to said piston from said electronic valve in response to movement of said electronic valve between an open and a closed position;
c. fluid supply means for supplying fluid pressure to said fluid piston from said electronic valve; and
d. linkage means connecting said fluid piston ram to a clutch to move the clutch from a disengaged to an engaged position when said fluid piston ram is moved in response to the opening and closing of said electronic valve.

4. The safety apparatus of claim 1 wherein said shut-off switching means include:
a. a shut-off switch positionable adjacent a press crankshaft and having a movable contact element, said shut-off switch movable between an open and closed position when said contact element is moved;
b. a cam connectable to a crankshaft to rotate therewith, said cam having an uneven exterior contour with an extended actuating portion and being connected to the crankshaft generally adjacent said shut-off switch such that the actuator portion of the cam activates said shut-off switch when the crankshaft has moved a press ram to complete a pressing cycle; and
c. circuit means interconnecting said shut-off switch and said drive-brake motor to shut off power to the motor when said shut-off switch is moved between an open and a closed position thereby braking movement of a flywheel which may be operably connected to said drive-brake motor.

5. The safety apparatus of claim 1 wherein said timing switch includes means for selectively varying the time delay of the timing switch.

6. The safety apparatus of claim 4 wherein:
a. said starting switch is magnetic switch movable between an open and closed position in response to the movement of a metallic member thereby; and
b. said safety shield contains a metallic member to actuate said magnetic starting switch when said safety shield moves between its open and closed position.

7. A punch press with safety apparatus for stopping and starting a press flywheel at each pressing cycle, said punch press comprising:
a. drive motor having braking means to brake the motor when power to it is cut off;
b. a flywheel;
c. flywheel connecting means for operably connecting said drive motor to said flywheel to rotate the flywheel when said drive motor is powered and to brake the motion of the flywheel when power is cut off to said motor;
d. a crankshaft in combination with a ram, said crankshaft being engageable with the flywheel, and acting to drive the ram through a pressing cycle once said crankshaft is turned through one revolution;
e. a selectively engageable clutch for engaging said flywheel with said crankshaft;
f. a triggering device for initiating the pressing cycle of said crankshaft;
g. starting switch means movable between an open and a closed position wherein power may be transmitted from a power source therethrough;
h. starting switch actuation means responsive to activation of said triggering device operably connected with the triggering device and with said starting switch means for moving said starting switch means between an open and a closed position when said triggering device is activated;
i. an energizable timing switch operably connected with said starting switch means so as to become energized when the starting switch means are actuated, said timing switch having a time delay which is initiated when said timing switch is energized, said timing switch being automatically movable between an open and a closed position at the end of the time delay;
j. circuit means operably connecting at least said drive motor and said starting switch means with the power source for starting the drive motor as the timing switch is energized by actuation of the starting switch means;
k. engagement means operably connected to said timing switch for positively engaging said clutch, said engagement means being movable from a disengaged to an engaged position in response to the switching of said timing switch at the end of the time delay to thereby allow the flywheel to move the press through a pressing cycle; and
l. shut-off switching means operably attached to said crankshaft and said circuit means for shutting off power to said drive motor after one pressing stroke of the ram has been completed, thereby braking the motion of said flywheel.

8. The punch press of claim 7 wherein
a. said starting switch actuation means include a safety shield movable from an open position wherein the work area beneath the ram is generally accessible, to a closed shielding position wherein the work area beneath the ram is generally inaccessible, said shield movable from the open to the closed position in response to activation of said triggering device; and
b. said starting switch means include a starting switch movable from an open to a closed position in response to movement of said safety shield from its open to its closed position.

9. The punch press of claim 8 wherein said engagement means include:
a. an electronically controlled valve for selectively passing fluid pressure from a fluid pressure source, said valve movable between an open and a closed position in response to the switching of said timing switch at the end of the time delay;
b. a fluid piston having a movable ram which is moved by fluid pressure channelled to said piston from said electronic valve in response to movement of said electronic valve between an open and a closed position;

c. fluid supply means for supplying fluid pressure to said fluid piston from said electronic valve; and d. linkage means connecting said fluid piston ram to said clutch to move the clutch from a disengaged to an engaged position when said fluid piston ram is moved in response to the opening and closing of said electronic valve.

10. The punch press of claim 7 wherein said shut-off switching means include:

a. a shut-off switch positionable adjacent said crankshaft and having a movable contact element, said shut-off switch movable between an open and a closed position when said contact element is moved;

b. a cam connected to said crankshaft to rotate therewith, said cam having an uneven exterior contour with an extended actuating portion and being connected to the crankshaft generally adjacent said shut-off switch such that the actuator portion of the cam activates the shut-off switch when the crankshaft has moved the press ram to complete a pressing cycle; and c. circuit means interconnecting said shut-off switch and said drive-brake motor to shut off power to the motor when said shut-off switch is moved between an open and a closed position thereby braking movement of said flywheel.

* * * * *

UNITED STATES PATENT OFFICE
CERTIFICATE OF CORRECTION

Patent No. 4,037,699  Dated July 26, 1977

Inventor(s) Peter J. Cronen, Jr.

It is certified that error appears in the above-identified patent and that said Letters Patent are hereby corrected as shown below:

Column 2, line 5, change the word "they" to the word --the--.

Column 4, line 26, change the word "ishigh" to the words --is high--.

Column 7, line 3, after "flywheel" insert --10--.

Column 7, line 40, after "valve" insert --but--.

Column 8, line 12, change the words "rod 6" to the words --rod 69--.

Column 9, line 24, change the words "arm 26" to the words --arm 76--.

Column 12, line 34, change the word "operable" to the word --operably--.

Signed and Sealed this

Eighth Day of November 1977

[SEAL]

Attest:

RUTH C. MASON
Attesting Officer

LUTRELLE F. PARKER
Acting Commissioner of Patents and Trademarks